March 29, 1949. J. KELLER Re. 23,095

DEVICE FOR MANUFACTURING THIN-WALLED CONTAINERS OPEN AT ONE END

Original Filed Aug. 31, 1944

INVENTOR:

Jakob Keller

BY Richards & Geier

ATTORNEYS

Reissued Mar. 29, 1949 Re. 23,095

UNITED STATES PATENT OFFICE 23,095

DEVICE FOR MANUFACTURING THIN-WALLED CONTAINERS OPEN AT ONE END

Jakob Keller, Zurich, Switzerland

Original No. 2,412,813, dated December 17, 1946, Serial No. 552,019, August 31, 1944. Application for reissue October 17, 1947, Serial No. 780,461

2 Claims. (Cl. 113—49)

Containers open at one end are already made by deep drawing. The blank used when such containers are cylindrical in shape is a circular tin disc, which is drawn by a draw-punch through a die. A device is already in use in which several drawing rings are arranged in the die in such a manner that the thickness of the walls is reduced while the container is drawn out by a single punch.

This process can be successfully exploited for materials with a high degree of toughness, while the manufacture of containers open at one end from soft materials, for example aluminum, is only possible under certain limitations. For this reason it has till now been necessary to utilise the heat-drawing process instead of the cold-drawing process for aluminum containers. None of the devices and procedures proposed offers, however, the possibility of manufacturing in a single operation containers with walls only a few tenths of a millimetre thick. This will be easily understood if it is realised that in deep drawing the forming stresses must be taken up by the metal itself, and in consequence walls a few tenths of a millimetre thick cannot be obtained.

The invention hereafter described solves the problem of the production of containers open at one end, made of aluminum or other soft homogeneous metal and with walls only a few tenths of a millimetre thick. By means of the device to which the invention relates, the black is deep-drawn in the usual way by a single punch, first through an ordinary die, and then through a series of ring dies. Here, however, the first ring die is fitted in such a way that the container to be drawn, on entering this ring, still engages with the upper part of the primary die, while the following ring dies are placed at a distance one from the other to equal at least 90% of the depth of the container on entering the next ring.

Figure 1:
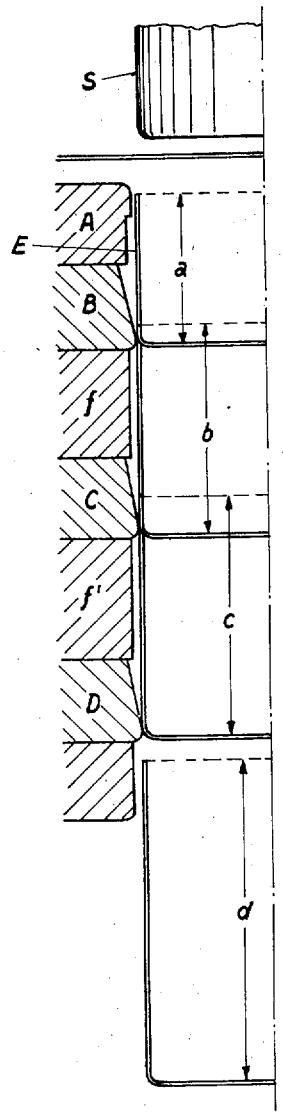
Figure 2:
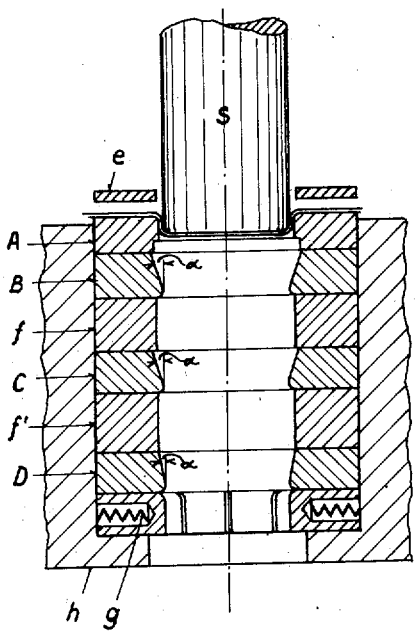

In the accompanying drawing, Fig. 1 depicts the arrangement of the single ring dies, while Fig. 2 is a cross-section of an example of the device with three ring dies. The following is a description of the invention in greater detail in relation to the drawing.

Punch S, which is precisely cylindrical, forms with die A and rim-holder *e* a drawing tool, which does not differ from the tools of this type already in use. It follows that can E, with a depth equal to *a*, is produced in the usual way.

Before its open end leaves the drawing surface of die A, can E (whose depth is *a*) is carried by punch S into ring die B which draws the wall of the can to a depth equal to *b*. The second ring die C is separated from the first ring B by distance-ring *f*, and the interval between them is such that the upper edge of the can, whose depth is now *b*, is still engaged in ring B, when its bottom already penetrates into ring C. The depth of the can—previously equal to *b*—is in the same way increased by its passage through ring C to *c*. In like manner the action of the third ring die D draws the depth of the can from *c* to *d*. The thickness of the two distance-rings *f* and *f'* separating ring dies B, C and D, is determined by the increment of the depth of the can, which is in turn proportionate to the decrease of the thickness of its walls caused by each drawing process.

In Fig. 2 die A, ring dies B, C and D as well as distance-rings *f* and *f'* and stripping-ring *g*, are combined in holder *h* to form the deep-drawing tool which is the object of the invention.

Obviously the ring dies have successively diminishing diameters, the sizes of which depend upon the desired decrease in the thickness of the can walls.

At the instant the container enters the first ring die, the material to be formed has the same speed as the punch. It can be demonstrated mathematically that when leaving the ring the metal retains the speed of the punch, but that the metal above the ring die moves more slowly than the punch, and in fact that a retrograde movement takes place. On this circumstance is based the first condition essential for the production of thin-walled containers, viz., that the interval between the first ring die and the upper edge of the deep-drawing die must be such that, at the instant the container enters the ring die, its open end engages with the upper edge of the deep-drawing die. If this requirement is not complied with, the afore-mentioned retrograde movement causes a reflux of the metal against the rim-holder, and the ensuing pressure makes the fracturing of the container inevitable. If the interval is greater, the upper part of the punch is no longer guided, and the operation cannot proceed smoothly, quite apart from the fact that the stroke of the punch is also quite uselessly and unnecessarily increased.

After its passage through the first ring die, the depth of the container is increased in proportion to the reduction of the thickness of its walls. If it is now allowed to enter the second ring before its passage through the first ring approaches completion, the retrograde movement of the tin caused by the second ring results in a pressure against the first ring, i. e., the metal leaving the first ring collides with that flowing back; again breakage is unavoidable. In consequence the interval must be such that the container enters the second ring die only when the work of the first ring die is almost terminated. The slight pressure that still occurs will then have the useful function of loosening the wall of the container from the punch.

More important than this loosening action is, however, the guiding in the second ring die. The purpose of the process to which the invention relates is the manufacture of containers with walls a few tenths of a millimetre thick. The centering tolerance is, in consequence, of the order of $^1/_{100}$ mm., i. e. of the order of small, and even negligible, deformations. On the other hand, to increase the working speed, it is of interest that the stroke of the punch should be as small as possible. A limited degree of overlapping of successive operations offers the further advantage of a process smooth and free from shocks; and it is obvious that, owing to the thinness of the container's walls, even slight shocks result in breakage.

Thorough experiments have proved that the best results are obtained with a pressure arising through an interval between the rings 10% smaller than the corresponding depth of the can.

Particularly favourable results have been achieved in the manufacture of aluminum cans. This is most probably due to the fact that in the process to which the invention relates shaping is effected simply by the strain caused by the reciprocal action of ring and punch; and aluminum can be shaped under the effect of this strain not only with exceptional ease, but also very uniformly.

Essential for the success of the process is also the profile of the ring dies. Repeated experiments have proved that the best results are achieved with a lateral angle of 10±3°.

I claim:

1. A device for manufacturing thin-walled containers open at one end, in which the raw material is drawn in the usual manner by a single punch first through a deep-drawing die and then through a series of ring dies, said device characterised in that the first ring die is so fitted that the container, on entering this ring, is still within the upper part of the deep-drawing die, and that the successive ring dies are arranged at intervals from each other equal to at least 90% and less than 100% of the depth of the container at the entrance to the next ring.

2. A device according to claim 1, characterized in that the ring dies have a lateral angle of 10±3° flaring outwardly from their bottom to their top surfaces.

JAKOB KELLER.

REFERENCES CITED

The following references are of record in the file of this patent:

UNITED STATES PATENTS

| Number | Name | Date |
|---|---|---|
| 375,776 | Seger | Jan. 3, 1888 |
| 760,921 | Rigby | May 24, 1904 |
| 1,720,375 | Parker | July 9, 1929 |
| 1,742,795 | Tanner | Jan. 7, 1930 |
| 2,433,929 | Slater | Jan. 6, 1948 |

FOREIGN PATENTS

| Number | Country | Date |
|---|---|---|
| 658,898 | Germany | 1938 |